United States Patent Office 3,356,706
Patented Dec. 5, 1967

3,356,706
CHLOROMETHYL 1-BUTANETHIOSULFONATE
John D. Buckman, John D. Pera, and Fred W. Raths, Memphis, Tenn., assignors to Buckman Laboratories, Inc., Memphis, Tenn., a corporation of Tennessee
No Drawing. Filed Dec. 5, 1966, Ser. No. 598,945
1 Claim. (Cl. 260—453)

ABSTRACT OF THE DISCLOSURE

Chloromethyl 1-butanethiolsulfonate prepared by a reaction of a salt of butanethiolsulfonic acid with bromochloromethane or by the reaction of butane 1-sulfinic acid salt with chloromethane sulfenyl chloride is useful as a microbicide.

---

This invention relates to the novel compound chloromethyl 1-butanethiolsulfonate, its preparation, and its use in controlling the growth and reproduction of microorganisms. More particularly, the product of this invention is useful in combating microorganisms in industrial and agricultural processes and products.

Many industrial products, both during the process of manufacture and as the finished product, are normally susceptible to microbial degradation of means are not taken to inhibit such degradation. Wood pulp, starch and proteinaceus substances, animal hides, vegetable tanning liquors, and leather are all damaged or degraded by the growth of fungi and other microorganisms or by enzymes produced by such growth. In agriculture, chloromethyl 1-butanethiolsulfonate may be used as a seed, plant, and soil microbicide for protecting seeds, seedlings emerging from seeds, and plants against attack by fungi and bacteria. In addition, this compound has plant growth regulating properties and it may be used for selective weed control and defoliation purposes.

It has been suggested in the chemical literature that certain trichloromethyl alkane and aromatic thiolsulfonates and chlorinated lower alkyl methane- and ethanethiolsulfonates wherein the ethane and methane radical may be monochlorinated could be used as bactericides and fungicides in industrial process systems. These compounds, while effective as bactericides and fungicides, are not entirely satisfactory. Trichloromethyl esters of thiolsulfonic acids generally have strong irritating odors, very slight solubility in aqueous systems, are difficult to disperse in water, and are subject to rapid hydrolysis in aqueous systems. The chlorinated lower alkyl methane- and ethanethiolsulfonates wherein the alkyl group is methyl have limited stability and the vapors are irritating to the mucous membranes. This instability and objectionable irritating property may be more or less alleviated by substituting a chlorinated propyl, chlorinated butyl, or chlorinated higher alkyl group for the chlorinated methyl group, but such a result is attained only at the sacrifice of a major portion of the activity of the compound as a microbicide. The chloromethyl 1-butanethiolsulfonate has only a mild odor, is soluble in the common organic solvents, is easy to disperse in water, and its vapors are not irritating. Furthermore, this compound does not tend to hydrolyze rapidly in the presence of water at relatively high temperatures. A compound such as chlorobutyl methanethiolsulfonate possesses a mild odor and is relatively stable in the presence of moisture at elevated temperatures, but such a compound possesses only little activity against some important microorganisms such as fungi.

It is, therefore, a principal object of the present invention to provide a new composition of matter for the control of microorganisms.

This and other objects and advantages of the process and composition will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few ways in which the principles of the invention may be employed.

Chloromethyl 1-butanethiolsulfonate may be prepared by any one of the following methods:

(1) Reaction of a salt of butanethiolsulfonic acid with bromochloromethane.

(2) Reaction of butane 1-sulfinic acid salt with chloromethane sulfenyl chloride.

The thiolsulfonate of our invention is a liquid which is soluble in common organic solvents such as alkyl and aromatic hydrocarbons, alcohols, ketones, esters, ether alcohols, dimethylformamide, dimethylsulfoxide, and other solvents. The addition of a surfactant to the solution renders the compound of our invention readily dispersible in water. In general, nonionic dispersants are preferred. Examples of such preferred nonionic dispersants include alkylphenoxypolyoxyethylene ethanol or alkylpolyoxyethylene ethanol. It should be understood, however, that suitable dispersants are not so limited.

In order to disclose the nature of the invention still more clearly, the following illustrative examples will be given. It is understood, however, that the invention is not to be limited to the specific conditions or details set forth in these examples, except insofar as such limitations are specified in the appended claim.

*Example 1.—Preparation of chloromethyl 1-butanethiolsulfonate*

A 2-liter, three-necked reaction flask was charged with 95 grams (0.54 mole) of sodium 1-buthanethiolsulfonate, 350 grams (2.70 moles) of bromochloromethane and 500 milliliters of acetone. The reaction mixture was heated at reflux temperature for 17 hours, filtered and the acetone removed from the filterate under reduced pressure. The resulting residue was dissolved in methylene chloride, washed twice with water, separated, the methylene chloride solution dried with anhydrous magnesium sulfate and the methylene chloride removed by distillation. Chloromethyl 1-butanethiolsulfonate, 83 grams, 76 percent crude yield, $n_D{}^{25}$ 1.5170, was obtained. Calcd. for $C_5H_{11}ClO_2S_2$: Cl, 17.49. Found: Cl, 15.38.

*Example 2*

The effectiveness of chlorinated alkanethiolsulfonates against *Aerobacter aerogenes* were tested by the pulp-substrate method described in U.S. Patent 2,881,070, which disclosure is hereby made a part of this application, using *Aerobacter aerogenes* and pulp substrates that were buffered to pH values of 5.5, 6.5, and 7.5, respectively. The results are listed in Table 1.

TABLE 1.—PERCENTAGE KILL OF *AEROBACTER AEROGENES* IN A PULP SUBSTRATE AT pH 5.5, 6.5, AND 7.5 A 18 HOURS CONTACT WITH THE COMPOUNDS LISTED BELOW

| pH | Concentration (parts per million) | Compounds tested | | | | | | | |
|---|---|---|---|---|---|---|---|---|---|
| | | Chloromethyl methanethiolsulfonate (kill in percent) | Chloromethyl ethanethiolsulfonate (kill in percent) | Chloromethyl 1-butanethiolsulfonate (kill in percent) | Trichloromethyl butanethiolsulfonate (kill in percent) | 2-Chloropropyl methanethiolsulfonate (kill in percent) | 4-Chlorobutyl methanethiolsulfonate (kill in percent) | 2-Chloroethyl methanethiolsulfonate (kill in percent) | 2-Chloroethyl ethanethiolsulfonate (kill in percent) |
| 5.5 | 0.5 | 100 | 100 | 99.5 | 5 | 99.9 | 99.8 | 99.9 | 51 |
| | 1 | 100 | 100 | 99.6 | 27 | 99.9 | 99.9 | 99.9 | 98 |
| | 2 | 100 | 100 | 99.9 | 99 | 100 | 99.97 | | 99.7 |
| | 4 | 100 | 100 | 99.9 | 99 | 100 | 99.98 | 100 | 100 |
| 6.5 | 0.5 | 99.96 | 100 | 70 | 23 | 99.6 | 99 | 85 | 20 |
| | 1 | 100 | 100 | 99 | 20 | 99.6 | 99.8 | 97 | 36 |
| | 2 | 100 | 100 | 99.9 | 71 | 99.7 | 99.99 | 99.8 | 99 |
| | 4 | 100 | 100 | 99.8 | 98 | 99.97 | 99.99 | 99.9 | 99.7 |
| 7.5 | 0.5 | 15 | 46 | 28 | 11 | 24 | 48 | 0 | 16 |
| | 1 | 18 | 49 | 13 | 0 | 34 | 65 | 24 | 24 |
| | 2 | 99 | 60 | 48 | 11 | 88 | 92 | 87 | 33 |
| | 4 | 99.9 | 99.6 | 89 | 15 | 99.9 | 99 | 77 | 93 |
| | 8 | 99.96 | 99.97 | 96 | 10 | 99.96 | | 99 | 99.9 |
| | 12 | 99.95 | 99.6 | 99.9 | 70 | 99.98 | | 99.9 | 99.9 |
| | 16 | 100 | 99.9 | 99.99 | 94 | 99.99 | | 99.9 | 100 |
| | 25 | 100 | | 99.99 | 99.7 | 99.99 | | 99.96 | 99.98 |

Example 3

The effectiveness of several chlorinated alkyl alkanethiolsulfonates on the two fungi *Penicillium roqueforti* and *Chaetomium globosum*, was determined in this example. A variation of the pulp-substrate method used in Example 2 was utilized for these tests.

The pulp-substrate test method, which can be employed with various test microorganisms, simulates the conditions prevailing during actual papermaking operations, that is, those existing in a simple furnish for papermaking.

When fungi are used as test organisms, the pulp-substrate test method is modified to permit the growth of these microorganisms. The pulp substrate comprises an aqueous slurry of spruce groundwood containing 1 percent by weight (dry basis) of wood fibers and it is enriched by the addition of 0.26 percent of sodium nitrate and 0.64 percent of maltose (technical grade). Forty-gram portions of the enriched groundwood pulp slurry were added to 250-milliliter Pyrex Erlenmeyer flasks fitted with loose metal caps and then sterilized. Each of the following substances was then added to the flasks in the order listed:

(1) Sterile distilled or sterile demineralized water as required in each individual case to bring the total weight of the contents of each flask to 50 grams, after allowing for all subsequent additions specified hereinafter (including inoculation with the aqueous suspension of spores and/or mycelial fragments of the test fungus).

(2) One milliliter of a 2.0 percent by weight sterile solution of rosin size. Rosin size is the pasty sodium soap of rosin containing approximately 20 to 30 percent free rosin and 30 percent water. A suitable rosin size is that known as rosin size 70D made by Papermakers' Chemical Department, Hercules Powder Co., Kalamazoo, Mich.

(3) Solution of toxicant or control agent to be evaluated in each test, to give the concentration desired in parts per million by weight.

(4) Sterile solution of buffer salts to adjust the substrate to a pH of 4.5 to 5.0, prepared from 0.2 molar solutions of potassium acid phthalate and sodium hydroxide.

(5) Inoculum consisting of 1 milliliter of an aqueous suspension of spores and/or mycelial fragments of the test organism. *Chaetomium globosum* and *Penicillium roqueforti* are test fungi which were used for these tests.

The buffer mixtures were prepared following the procedure disclosed in U.S. Patent 2,881,070.

After the inoculant suspensions of the test fungi had been added, the flasks were allowed to incubate at a temperature of 30±1° C. for a period adequate for growth in the controls (those portions of pulp substrate which contained no toxicant). The customary periods of observation were after 7 and 14 days. Growth was recorded after each period on the basis of the following key:

4=excellent
3=good
2=poor
1=very poor, scant, questionable
0=no growth

The results are summarized in Table 2.

TABLE 2.—INHIBITION OF *PENICILLIUM ROQUEFORTI* AND *CHAETOMIUM GLOBOSUM* BY THE COMPOUNDS LISTED BELOW IN A PULP SUBSTRATE AFTER 14 DAYS INCUBATION

| Test organism | Concentration (parts per million) | Compounds tested | | | | | | | | |
|---|---|---|---|---|---|---|---|---|---|---|
| | | Chloromethyl methanethiolsulfonate | Chloromethyl ethanethiolsulfonate | Chloromethyl 1-butanethiolsulfonate | Chloromethyl 1-pentanethiolsulfonate | Trichloromethyl butanethiolsulfonate | 3-Chloropropyl methanethiolsulfonate | 4-Chlorobutyl methanethiolsulfonate | 2-Chloroethyl methanethiolsulfonate | 2-Chloroethyl ethanethiolsulfonate |
| *Penicillium roqueforti* | 1 | 0 | 4 | 0 | 4 | 2 | 4 | 4 | 4 | 4 |
| | 3 | 0 | 0 | 0 | 4 | 1 | 4 | 4 | 4 | 4 |
| | 5 | 0 | 0 | 0 | 4 | 1 | 4 | 4 | 4 | 4 |
| | 7 | 0 | 0 | 0 | 0 | 0 | 4 | 4 | 4 | 4 |
| | 10 | 0 | 0 | 0 | 2 | 0 | 4 | 4 | 4 | 4 |
| | 15 | 0 | 0 | 0 | 0 | 0 | 4 | 0 | 4 | 0 |
| | 20 | 0 | 0 | 0 | 0 | 0 | 0 | 0 | 0 | 0 |
| | 25 | 0 | 0 | 0 | 0 | 0 | 0 | 0 | 0 | 0 |
| | 50 | 0 | 0 | 0 | 0 | 0 | 0 | 4 | 0 | 4 |
| *Chaetomium globosum* | 1 | 4 | 3 | 2 | 4 | 4 | 4 | 4 | 4 | 4 |
| | 3 | 0 | 0 | 0 | 4 | 2 | 4 | 4 | 4 | 4 |
| | 5 | 0 | 0 | 0 | 4 | 1 | 4 | 4 | 4 | 4 |
| | 7 | 0 | 0 | 0 | 3 | 0 | 4 | 4 | 4 | 4 |
| | 10 | 0 | 0 | 0 | 2 | 0 | 4 | 4 | 4 | 4 |
| | 15 | 0 | 0 | 0 | 1 | 0 | 4 | 4 | 4 | 4 |
| | 20 | 0 | 0 | 0 | 0 | 0 | 4 | 4 | 4 | 4 |
| | 25 | 0 | 0 | 0 | 0 | 0 | 4 | 4 | 3 | 2 |
| | 50 | 0 | 0 | 0 | 0 | 0 | 0 | 4 | 1 | 0 |

4=excellent growth; 3=good; 2=poor; 1=very poor; 0=no growth.

Example 4

This example is concerned with a lap pulp preservation test which simulates the conditions prevailing during the storage of moist groundwood lap pulp in pulp and paper mills.

The lap pulp preservation tests were conducted upon a pulp substrate consisting of specimens of spruce lap pulp which weighed 2.5±0.1 grams each on an oven-dry basis and measured approximately 7 centimeters in diameter. Each test specimen was placed in a sterilized glass petri dish and the following sequence of operations performed for various concentrations of the compositions.

(1) A suitable amount of mineral salts was introduced into each test specimen of oven-dry lap pulp by uniformly distributing 2.0 milliliters of the following solution over the test specimen:

| | | |
|---|---|---|
| Ammonium nitrate | grams | 3.0 |
| Dipotassium phosphate | do | 1.0 |
| Potassium chloride | do | 0.25 |
| Magnesium sulfate | do | 0.25 |
| Polyoxyethylene derivative of sorbitan monooleate | gram | 0.5 |
| Demineralized water | milliliters | 1000 |

After the test specimens were uniformly wetted, the entire series of specimens was dried in an oven at 105° C. for 1 hour. The petri dish covers were left partially open to facilitate drying.

(2) The chlorinated alkyl alkanethiolsulfonates were dissolved or dispersed in water at concentrations such that when 2.0 milliliters of the solution or dispersion was added to the lap pulp specimens, the desired concentration of the thiolsulfonates in the pulp was obtained. Untreated control specimens were prepared in duplicate by adding 2.0 milliliters of sterile water instead of the aqueous solution of the composition being tested.

(3) The final addition to each test specimen was that of the inoculum, which contained 0.5 milliliter of water to complete the total weight desired for the test specimen, namely, 5.0±0.1 grams. The pulp specimens thus contained 50 percent water and 50 percent pulp. With the fungi *Aspergillus niger*, *Chaetomium globosum*, and *Pullularia pullulans*, suitable spore suspensions were readily obtained from mycophil or malt agar tube slants which were added carefully to the upper side of the prepared test specimens of lap pulp.

(4) A tight-fitting wide rubber band was then placed over each petri dish with its inoculated lap pulp specimen to minimize the loss of moisture from the specimen during incubation. The temperature of incubation was 28° to 30° C.

(5) Observations of the test specimens were started after 1 week and continued weekly until the end of the fourth week.

At the end of the four-week period, the compounds had inhibited the growth of the test organisms as shown in Table 3.

TABLE 3

| | Lowest inhibiting concentration for— | | |
|---|---|---|---|
| | A. niger (parts per million) | Ch. globosum (parts per million) | Pul. pullulans (parts per million) |
| Chloromethyl chloromethanethiolsulfonate | 75 | 100 | 50 |
| Dichloromethyl dichloromethanethiolsulfonate | 200 | 75 | 200 |
| Chloromethyl methanethiolsulfonate | 75 | 200 | 25 |
| Chloromethyl 1-butanethiolsulfonate | 10 | 75 | 25 |
| Dichloromethyl methanethiolsulfonate | 50 | 50 | 50 |

Example 5

The compound chloromethyl 1-butanethiolsulfonate was tested by the pulp-substrate method described in U.S. Patent 2,881,070 using *Pseudomonas aeruginosa* and a pulp substrate that was buffered to a pH value of 6.5. The results are tabulated in Table 4.

TABLE 4.—PERCENTAGE KILL OF *PSEUDOMONAS AERUGINOSA* IN A PULP-SUBSTRATE AT pH 6.5 AFTER 18 HOURS CONTACT WITH CHLOROMETHYL 1-BUTANETHIOLSULFONATE

| Concentration, parts per million: | Chloromethyl 1-butanethiolsulfonate, kill in percent |
|---|---|
| 0.1 | 98 |
| 0.5 | 99.99 |
| 1 | 99.5 |
| 2 | 100 |
| 4 | 100 |
| 8 | 100 |
| 12 | 100 |
| 16 | 100 |
| 25 | 100 |

Example 6.—*Hydrolysis rates of chloromethyl alkanethiolsulfonates*

Approximately 4 grams of each thiolsulfonate was accurately weighed and dissolved in 200 milliliters of ethanol. These solutions were diluted with deionized water to 1000 milliliters in a volumetric flask. Additional alcohol was added if necessary to effect solution of the thiolsulfonate. A 100-milliliter aliquot was immediately withdrawn and titrated potentiometrically using a silver electrode with 0.040 normal silver nitrate to determine the blank for subsequent titrations. The remaining solutions were stored at 50° C., sampled and titrated at various time intervals. The break in the titration curves at 250 millivolts was taken as the end-point for the titrations. Plots of ln (concentration of thiolsulfonate) versus time gave straight lines with slopes equal to the first order hydrolysis rate constants for the individual thiolsulfonates. The results of these experiments are listed below. The chloromethyl 1-butanethiolsulfonate is at least twice as stable to aqueous hydrolysis as the corresponding methyl analogue and from fifteen to fifty times more stable than the trichloromethyl methanethiolsulfonate and chloromethyl chloromethanethiolsulfonate, respectively.

| | First order rate constant (hr.$^{-1}$) |
|---|---|
| Chloromethyl 1-butanethiolsulfonate | 0.025 |
| Chloromethyl methanethiolsulfonate | 0.054 |
| Chloromethyl ethanethiosulfonate | 0.052 |
| Trichloromethyl methanethiolsulfonate | 0.34 |
| Chloromethyl chloromethanethiolsulfonate | 1.17 |

Example 7.—*Thermal stability of the chloromethyl butanethiolsulfonates*

The thermal stability of chloromethyl 1-butanethiolsulfonate, chloromethyl 2-butanethiolsulfonate, and chloromethyl 2-methyl-1-propanethiolsulfonate was determined by heating samples of these materials in glass ampoules at 98° C. for various time periods. The area of the chloromethyl butanethiolsulfonate peaks as determined by gas-liquid chromatography were compared with the area of the peaks of unheated samples to enable calculation of the percentage decomposition of the sample with the following formula:

$$\text{Percentage decomposition} = \frac{(A_0 - A_t)100}{A_0}$$

where $A_0$ is the area of the thiolsulfonate peak before heating and $A_t$ the area at time $t$. Areas were measured in square millimeters by triangulation. Gas-liquid chromatography was performed on a Perkin Elmer Model 800 Gas Chromatograph instrument with a hydrogen flame detector. Results of these experiments are given in Table 5 and these clearly demonstrate the marked thermal stability of the 1-butane isomer.

TABLE 5.—THERMAL DECOMPOSITION OF CHLOROMETHYL BUTANETHIOLSULFONATES

|  | Area of Bu-SO₂SCH₂Cl (square millimeters) | | | Decomposition (percent) | | |
| --- | --- | --- | --- | --- | --- | --- |
|  | 0 hr. | 24 hr. | 48 hr. | 0 hr. | 24 hr. | 48 hr. |
| Chloromethyl 1-butanethiolsulfonate | 576 | 424 | 143 | 0 | 26 | 75 |
| Chloromethyl 2-butanethiolsulfonate | 764 | 372 | 0 | 0 | 51 | 100 |
| Chloromethyl 2-methyl-1-propanethiolsulfonate | 890 | 390 | 0 | 0 | 56 | 100 |

In the preceding examples we have compared the properties of chloromethyl 1-butanethiolsulfonate with the thiolsulfonates closely related in structure. This invention is based on the fact that chloromethyl 1-butanethiolsulfonate is a new compound possessing unique and unexpected properties which make it particularly useful as a microbicide.

Fungi and bacteria grow only where adequate sources of water are available to the microorganisms and it is essential that a microbicide possess sufficient stability in water so that concentrations toxic to the microorganisms can be maintained.

Chloromethyl alkanethiolsulfonates in which the alkane group contains less than four carbon atoms are considerably less stable to hydrolysis than chloromethyl 1-butanethiolsulfonate. It is very unlikely that toxic concentrations of these compounds could be maintained in most instances using practical treating techniques. In addition, the compounds containing alkane groups with from one to three carbon atoms are irritating to mucous membranes and could not be used where workmen are likely to come into contact with vapors of aqueous sprays containing these compounds.

Chloromethyl butanethiol sulfonates in which the butane group is a branched chain are much less stable in the absence of water than chloromethyl 1-butanethiolsulfonate and are difficult to prepare in reasonable purity because of this instability. These compounds possess short shelf lives and are not suitable as industrial microbicides. Moreover, the decomposition products are irritating and obnoxious.

The fungicidal activity of chloromethyl 1-pentanethiolsulfonate is surprisingly much less than that of the chloromethyl 1-butanethiolsulfonate. Thus, the effectiveness, stability to hydrolysis, and thermal stability of chloromethyl 1-butanethiolsulfonate are uniquely different in comparison to the other chloromethyl alkanethiolsulfonates.

Chloromethyl alkanethiolsulfonates which contain three chlorine atoms attached to the carbon of the ester group possess vile odors, cause severe irritation to the mucous membranes, are less stable to hydrolysis, and possess less fungicidal activity than chloromethyl 1-butanethiolsulfonate.

Other alkanethiolsulfonates containing ester groups in which chlorine is attached to alkyl groups other than methyl or in which the chlorine atom is attached at other than the alpha position also possess a markedly lower activity against fungi.

In summation, the new compound chloromethyl 1-butanethiolsulfonate is not only a microbicide effective at extremely low concentrations against a variety of microorganisms, but it possesses in a unique manner the properties thermal stability, stability to hydrolysis, low odor, and lack of irritation to human mucous membranes which make it particularly useful as a microbicide for general use.

Although the lowest concentration of the cholormethyl 1-butanethiolsulfonate used in our laboratory experiments was 0.05 parts per million parts of water, it is well known by those skilled in the art that in many cases much lower concentrations of the microbicide are effective when used in an industrial process. Accordingly, as to the amount of the chloromethyl 1-butanethiolsulfonate which may be added to the aqueous systems when used as a microbicide, suitable quantities vary from 0.01 to 500 parts per million parts of water. If, however, the ratio of water to organic material is low, for example, 10 to 1 or less, suitable quantities of the microbicide to be added to the system vary from 0.1 to 1,000 parts per million parts of the organic material. It will be understood, of course, that larger quantities of chloromethyl 1-butanethiolsulfonate may be used with no detrimental effect, but such larger quantities increase the cost of operation with limited material benefit.

While particular embodiments of the invention have been described, it will be understood, of course, that the invention is not limited thereto since many modifications may be made, and it is, therefore, contemplated to cover by the appended claim any such modifications as fall within the true spirit and scope of the invention.

The invention having thus been described, what is claimed and desired to be secured by Letters Patent is:

Chloromethyl 1-butanethiolsulfonate.

References Cited

UNITED STATES PATENTS

| 2,664,385 | 12/1953 | Wolff et al. | 260—453 X |
| 2,743,290 | 4/1956 | Stewart | 260—453 |
| 3,047,393 | 7/1962 | Herz et al. | 260—453 X |
| 3,145,226 | 8/1964 | Ratz et al. | 260—453 |
| 3,162,665 | 12/1964 | Szabo et al. | 260—453 |
| 3,275,506 | 8/1966 | Szabo et al. | |

OTHER REFERENCES

Boldyrev et al.: C.A., 56, page 4606 (1962).

JOSEPH P. BRUST, *Primary Examiner.*